(12) United States Patent
Rhodes et al.

(10) Patent No.: US 10,030,524 B2
(45) Date of Patent: Jul. 24, 2018

(54) MACHINED FILM HOLES

(71) Applicant: Rolls-Royce Corporation, Indianapolis, IN (US)

(72) Inventors: Jeffrey F. Rhodes, Zionsville, IN (US); Clinton A. Hammes, Zionsville, IN (US); Rusty M. Garner, Brownsburg, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 249 days.

(21) Appl. No.: 14/574,888

(22) Filed: Dec. 18, 2014

(65) Prior Publication Data

US 2016/0245092 A1    Aug. 25, 2016

Related U.S. Application Data

(60) Provisional application No. 61/919,421, filed on Dec. 20, 2013.

(51) Int. Cl.
*F01D 5/18* (2006.01)
*B23Q 15/22* (2006.01)
(Continued)

(52) U.S. Cl.
CPC ............. *F01D 5/186* (2013.01); *B23Q 15/22* (2013.01); *B23Q 17/20* (2013.01); *F01D 5/187* (2013.01); *F04D 29/324* (2013.01); *F04D 29/58* (2013.01); *F05D 2220/32* (2013.01); *F05D 2230/10* (2013.01); *F05D 2250/52* (2013.01); *F05D 2260/202* (2013.01); *F05D 2260/941* (2013.01)

(58) Field of Classification Search
CPC ...... F01D 5/186; F01D 5/187; F05D 2250/52; F05D 2260/202; F05D 2260/941; F05D 2230/10
See application file for complete search history.

(56) References Cited

U.S. PATENT DOCUMENTS

| 3,930,748 A | 1/1976 | Redman et al. |
|---|---|---|
| 4,688,310 A | 8/1987 | Kelm et al. |

(Continued)

FOREIGN PATENT DOCUMENTS

| DE | 10335657 A1 | 2/2005 |
|---|---|---|
| EP | 1873353 A2 | 1/2008 |

(Continued)

OTHER PUBLICATIONS

Office Action, and translation thereof, from counterpart Japanese Patent Application No. 2014-257672, mailed Feb. 9, 2016, 9 pp.

(Continued)

*Primary Examiner* — Ninh H Nguyen
(74) *Attorney, Agent, or Firm* — Shumaker & Sieffert, P.A.

(57) ABSTRACT

A component comprises a set of thin film cooling holes formed therein. Each of the thin film cooling holes provides a passage between a first surface of the component and a second surface of the component. Each of the thin film cooling holes includes a smooth transition between the first surface of the component and the surface the passage, and a progressively steeper flow path relative to the first surface of the component and between the smooth transition and the second surface of the component.

19 Claims, 11 Drawing Sheets

(51) Int. Cl.
*B23Q 17/20* (2006.01)
*F04D 29/32* (2006.01)
*F04D 29/58* (2006.01)

(56) References Cited

U.S. PATENT DOCUMENTS

| | | |
|---|---|---|
| 4,967,550 A | 11/1990 | Acton et al. |
| 5,005,353 A | 4/1991 | Acton et al. |
| 5,062,768 A | 11/1991 | Marriage |
| 5,082,421 A | 1/1992 | Acton et al. |
| 5,141,391 A | 8/1992 | Acton et al. |
| 5,271,715 A | 12/1993 | Zelesky et al. |
| 5,285,572 A | 2/1994 | Rathi et al. |
| 5,382,133 A | 1/1995 | Moore et al. |
| 5,392,515 A | 2/1995 | Auxier et al. |
| 5,419,039 A | 5/1995 | Auxier et al. |
| 5,476,363 A | 12/1995 | Freling et al. |
| 6,120,244 A | 9/2000 | Fukura |
| 6,241,468 B1 | 6/2001 | Lock et al. |
| 6,354,797 B1 | 3/2002 | Heyward et al. |
| 6,368,060 B1 * | 4/2002 | Fehrenbach ............ F01D 5/186 416/97 A |
| 6,491,498 B1 | 12/2002 | Seleski et al. |
| 6,508,620 B2 | 1/2003 | Sreekanth et al. |
| 6,745,101 B2 | 6/2004 | Andersen et al. |
| 6,773,230 B2 | 8/2004 | Bather et al. |
| 6,781,091 B2 | 8/2004 | Byrd et al. |
| 6,832,128 B2 | 12/2004 | Haupt |
| 6,912,446 B2 | 6/2005 | Wang et al. |
| 6,969,821 B2 | 11/2005 | Mika et al. |
| 7,124,588 B2 | 10/2006 | Gerendas et al. |
| 7,179,047 B2 | 2/2007 | Cooper |
| 7,198,458 B2 | 4/2007 | Thompson |
| 7,273,351 B2 | 9/2007 | Kopmels |
| 7,311,497 B2 | 12/2007 | Sharma et al. |
| 7,322,796 B2 | 1/2008 | Pietraszkiewicz et al. |
| 7,371,049 B2 | 5/2008 | Cunha et al. |
| 7,374,401 B2 * | 5/2008 | Lee ............ F01D 5/18 415/115 |
| 7,407,365 B2 | 8/2008 | Dodd |
| 7,413,406 B2 | 8/2008 | Pietraszkiewicz et al. |
| 7,625,178 B2 | 12/2009 | Morris et al. |
| 7,665,956 B2 | 2/2010 | Mitchell et al. |
| 7,997,868 B1 * | 8/2011 | Liang ............ F01D 5/186 416/97 R |
| 8,016,562 B2 | 9/2011 | Gu |
| 8,021,118 B2 | 9/2011 | Bergander et al. |
| 8,246,307 B2 | 8/2012 | Cheong et al. |
| 8,431,859 B2 | 4/2013 | Sasaki et al. |
| 8,591,191 B1 | 11/2013 | Liang |
| 8,672,613 B2 * | 3/2014 | Bunker ............ F01D 5/186 29/557 |
| 8,683,813 B2 * | 4/2014 | Xu ............ F01D 5/186 415/115 |
| 9,273,560 B2 * | 3/2016 | Gleiner ............ F01D 5/187 |
| 2003/0004606 A1 | 1/2003 | Duffin |
| 2003/0200005 A1 | 10/2003 | Hirai et al. |
| 2006/0253270 A1 | 11/2006 | Nguyen |
| 2008/0269944 A1 | 10/2008 | Hoffmann et al. |
| 2009/0319077 A1 | 12/2009 | Cameron |
| 2010/0030366 A1 | 2/2010 | Scherer |
| 2010/0034029 A1 | 2/2010 | Xiong et al. |
| 2010/0068067 A1 | 3/2010 | Liang |
| 2010/0095265 A1 | 4/2010 | Ewing et al. |
| 2010/0121478 A1 | 5/2010 | Jahn et al. |
| 2010/0161107 A1 | 6/2010 | Kappmeyer et al. |
| 2011/0011093 A1 | 1/2011 | Gerendas et al. |
| 2011/0038708 A1 | 2/2011 | Butkiewicz |
| 2011/0236206 A1 | 9/2011 | Seely |
| 2013/0209233 A1 | 8/2013 | Xu et al. |
| 2013/0259694 A1 | 10/2013 | Hirano et al. |
| 2014/0257543 A1 | 9/2014 | Rhodes et al. |

FOREIGN PATENT DOCUMENTS

| | | |
|---|---|---|
| EP | 2027963 A1 | 2/2009 |
| EP | 2070641 A2 | 6/2009 |
| GB | 2350809 A | 12/2000 |
| JP | 59019930 | 2/1984 |
| JP | H07180502 | 7/1995 |
| JP | H1054202 A | 2/1998 |
| JP | 2001012204 A | 1/2001 |
| JP | 2008121561 A | 5/2008 |
| JP | 2011006789 | 1/2011 |
| JP | 2012052535 A | 3/2012 |
| JP | 2013124627 A | 6/2013 |
| JP | 2013209905 A | 10/2013 |
| WO | 9819049 A1 | 5/1998 |

OTHER PUBLICATIONS

Extended Search Report from counterpart European Application No. 14198809.7, dated Apr. 28, 2015, 7 pp.
Response to Search Report dated Apr. 28, 2015, from counterpart European Application No. 14198809.7 filed Dec. 14, 2015, 9 pp.
The Notification of Reason for Rejection, and translation thereof, from counterpart Japanese Application No. 2014-257672, mailed Jan. 10, 2017, 5 pp.
Decision of Final Rejection, and translation thereof, from counterpart Japanese Application No. 2014-257672, dated Aug. 22, 2017, 6 pp.

* cited by examiner

MACHINED FILM HOLES

This application claims the benefit of U.S. Provisional Application No. 61/919,421, filed Dec. 20, 2013, which is incorporated by reference in its entirety.

TECHNICAL FIELD

The invention relates to film holes for thin film cooling, and more particularly, but without limitation, to machined film holes.

BACKGROUND

Components in a gas turbine engine are often cooled to survive the high temperatures found therein. One method used is thin film cooling by a supply of air, used as a cooling fluid, which is provided to a passage within the component, exiting via cooling holes to form a thin film over the external surface of the component. In addition to removing heat from the component by conduction, the thin film of cooling air serves to prevent hot gas within the gas turbine engine impinging upon the component.

The cooling air used for thin film cooling must be supplied at a pressure greater than the gas path pressure in which the component is operating. This requires work to be carried out on the cooling air, representing a loss of useful power from the engine. In some examples, machining or laser drilling may be used to form films holes having consistent diameters for thin film cooling.

In some examples, film cooling holes are shaped to reduce the use of cooling air. In one example, a shaped cooling hole may be a 2D diverging hole exiting at low incidence to the surface of the component to be cooled. This "fan" shaped hole allows the cooling film to form more readily than would a conventional constant-bore hole. Such cooling "fan" shaped holes may be manufactured using EDM spark erosion, or, more recently by laser drilling.

SUMMARY

This disclosure is directed to techniques for film cooling holes manufactured using machining processes, rather than laser or EDM processes. In one particular example, the disclosed techniques facilitate a film cooling hole machined with a Coanda ramp feature. As compared to cooling holes formed by laser or EDM processes, machined cooling holes can have features that are more sophisticated, thereby allowing more precise control of film cooling airflow and reducing the amount of cooling air required to provide adequate film cooling. In this manner, the disclosed techniques may provide efficiency improvements over prior techniques.

In one example, this disclosure is directed to a component comprising a set of thin film cooling holes formed therein. Each of the thin film cooling holes provides a passage between a first surface of the component and a second surface of the component. Each of the thin film cooling holes includes a smooth transition between the first surface of the component and the surface the passage, and a progressively steeper flow path relative to the first surface of the component and between the smooth transition and the second surface of the component.

In another example, this disclosure is directed to a component comprising a set of thin film cooling holes formed therein. Each of the thin film cooling holes provides a passage between a first surface of the component and a second surface of the component. The passage enters the first surface of the component at a non-perpendicular angle to form a lip on one side of the interface between the passage and the first surface of the component. The passage includes an edge break at the lip on the first surface of the component.

In a further example, this disclosure is directed to a method of manufacturing an array of thin film cooling holes in a component. The method comprises inspecting the component to obtain a component surface data set, determining machining paths for each of the thin film cooling holes in the array of thin film cooling holes based on the component surface data set, and for each of the thin film cooling holes, machining a passage between a first surface of the component and a second surface of the component. Machining the passage includes machining a smooth transition between the first surface of the component and the surface the passage, and machining a progressively steeper flow path relative to the first surface of the component and between the smooth transition and the second surface of the component.

The details of one or more examples of this disclosure are set forth in the accompanying drawings and the description below. Other features, objects, and advantages of this disclosure will be apparent from the description and drawings, and from the claims.

BRIEF DESCRIPTION OF DRAWINGS

FIGS. 12A-15B are close-up pictures illustrating components after forming holes, such a straight thin film cooling holes, using different manufacturing processes including picosecond laser, long pulse laser, EDM (bond coated) and mechanical machining processes.

DETAILED DESCRIPTION

Figure 1:
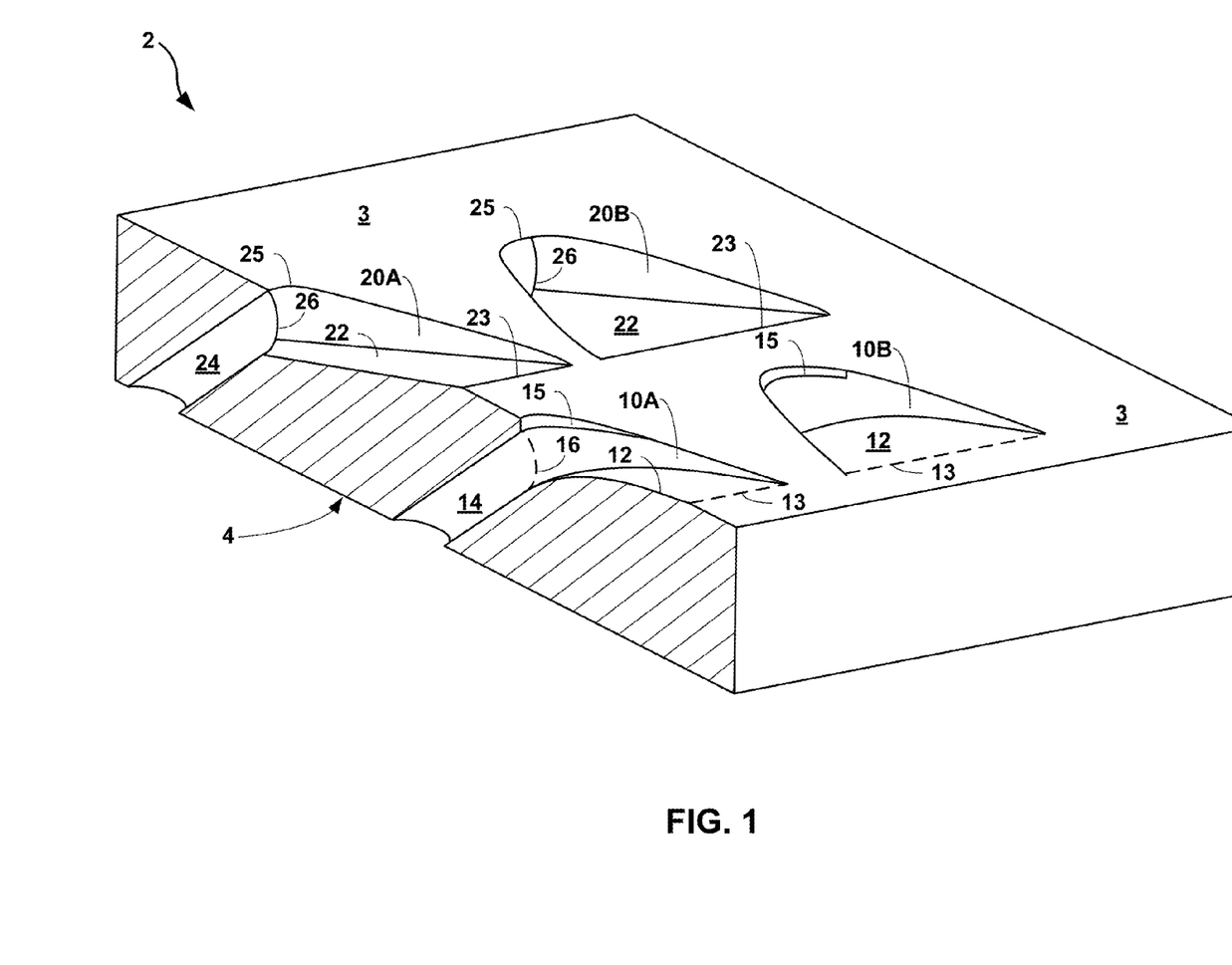
FIG. 1 is a conceptual illustration of a component including thin film cooling holes with a Coanda ramp and an edge break, features that may be implemented using adaptive machining processes.

FIG. 1 is a conceptual illustration of component 2, which includes thin film cooling holes 10A, 10B and thin film cooling holes 20A, 20B. Thin film cooling holes 10A, 10B includes features that are more sophisticated than those of thin film cooling holes 20A, 20B. In particular, thin film cooling holes 10A, 10B include Coanda ramps 12 and edge breaks 15. These intricate features allow more precise control of film cooling air and reduce the amount of cooling air required to provide adequate film cooling as compared to thin film cooling holes 20A, 20B. In some particular examples, component 2 may represent a blade airfoil configured for use in a gas turbine engine, or other component in which thin film cooling is desirable.

Thin film cooling holes 20A, 20B form passages between a first surface 3 of component 2 and a second surface 4 of component 2. Thin film cooling holes 20A, 20B are substantially similar to one another, but thin film cooling hole 20A is shown in a cut-away view. Thin film cooling holes 20A, 20B are fan shaped cooling holes with a straight section 24 and a ramp section 22. Straight section 24 may be formed by a drilling operation or with a consistent angle helical cutting action, while the ramp section may be formed by machining into surface 3 at a constant angle with a lateral back and forth action, e.g., with a rotating cutter.

The cutting actions used to form thin film cooling holes 20A, 20B leave a ridge 26 within thin film cooling holes 20A, 20B, and an angled transition 23 between ramp 22 and surface 3 of component 2. Ridge 26 and angled transition 23 can both interrupt laminar flow within thin film cooling holes 20A, 20B. The cutting actions used to form thin film cooling holes 20A, 20B also leaves sharp edge 25 at the interface of thin film cooling holes 20A, 20B and surface 3 opposite ramp 22. Component 2 can experience high stress concentrations at sharp edge 25, which may reduce the strength, reliability and/or service life of component 2.

Thin film cooling holes 10A, 10B form passages between a first surface 3 of component 2 and a second surface 4 of component 2. Thin film cooling holes 10A, 10B are substantially similar to one another, but thin film cooling hole 10A is shown in a cut-away view. Thin film cooling holes 10A, 10B are fan shaped cooling holes with a straight section 14 and a Coanda ramp section 12. Straight section 14 may be formed by a drilling operation or with a consistent angle helical cutting action, while the ramp section may be formed by machining into surface 3 at a varying angle with a helical cutting path, e.g., with a rotating cutter. In particular, the angle of cut used to form Coanda ramp section 12 varies from a near zero angle basically flush with surface 3 to a progressively steeper angle that matches the angle of straight section 14. In some examples, the angle of straight section 14 may be less than 75 degrees as compared to surface 3 and/or surface 4 of component 2. As another example, the angle of straight section 14 may be between about 80 degrees and about 60 degrees as compared to surface 3 and/or surface 4 of component 2.

The cutting actions used to form thin film cooling holes 10A, 10B leave a smooth transition 16 between straight section 14 and Coanda ramp section 12 within thin film cooling holes 10A, 10B. The cutting actions used to form thin film cooling holes 10A, 10B also leave a smooth transition 13 between Coanda ramp 12 and surface 3 of component 2. Smooth transition 13 may be wider than straight section 14 such that thin film cooling holes 10A, 10B provide a fanned configuration. Accordingly, Coanda ramp section 12 may progressively narrow between smooth transition 13 and straight section 14. As compared to ridge 26 and angled transition 23 of thin film cooling holes 20A, 20B, smooth transition 16 and smooth transition 13 can facilitate laminar flow from thin film cooling holes 10A, 10B, which can reduce the flow required to provide thin film cooling of component 2.

In addition, thin film cooling holes 10A, 10B also include edge break 15 at a lip formed at the interface of thin film cooling holes 10A, 10B and surface 3 opposite Coanda ramp 12. Edge brake 15 and the lip formed at the interface of thin film cooling holes 10A, 10B and surface 3 opposite Coanda ramp 12 may extend over straight section 14. As compared to lip 25 of thin film cooling holes 20A, 20B, edge break 15 may provide increased strength, reliability and service life of component 2 by mitigating stress concentrations in component 2 at the interface between thin film cooling holes 10A, 10B and surface 2.

In some examples, component 2 may be formed from a nickel super alloy. For example, as previously mentioned, component 2 may represent a blade airfoil configured for use in a gas turbine engine, or other component in which thin film cooling is desirable. Thin film cooling holes 10A, 10B, 20A, 20B may be machined from component 2 using high speed 5-axis machining with coated carbide cutters. In some examples, such cutters may have diameters between about 0.4 millimeters (mm) and 1.0 mm.

Machining of thin film cooling holes 10A, 10B requires significantly more precision than machining of thin film cooling holes 20A, 20B. As one example, providing smooth transition 13 requires a precise understanding of the location of surface 3 relative to the machining cutter in order to not create a distinct edge between Coanda ramp 12 and surface 3 of component 2. Similarly, machining edge break 15 requires a precise understanding of the location of surface 3 relative to the machining cutter in order to prevent the machining cutter from contacting a lower surface of thin film cooling holes 10A, 10B.

Film cooling holes 10A and 10B lie within a range of about 0.012 inches to about 0.060 inches in diameter and exit with tangency onto surface 3 within about 0.001 inches. Component 2 may range in thickness from about 0.014 inches to about 0.300 inches. Non-adaptive machining techniques may not be able to provide for precision required in order to machine thin film cooling holes 10A, 10B within component 2. For example, even if component 2 is one of a plurality of components manufactured using the same design and specifications, each of the plurality of components manufactured using the same design and specifications will vary to some degree from the original design and specifications. Machining thin film cooling holes 10A, 10B within component 2 may require mapping surface 3 of component 2 relative to a known coordinate system in which the machining equipment operates. Example techniques for adaptive machining component surfaces suitable for machining thin film cooling holes 10A, 10B within component 2 are disclosed in U.S. Provisional Patent Application Ser. No. 61/772,848 by Jeffrey F. Rhodes, et al., titled, "ADAPTIVELY MACHINING COMPONENT SURFACES AND HOLE DRILLING," and filed Mar. 5, 2013, the entire contents of which are incorporated by reference herein.

Figure 2:
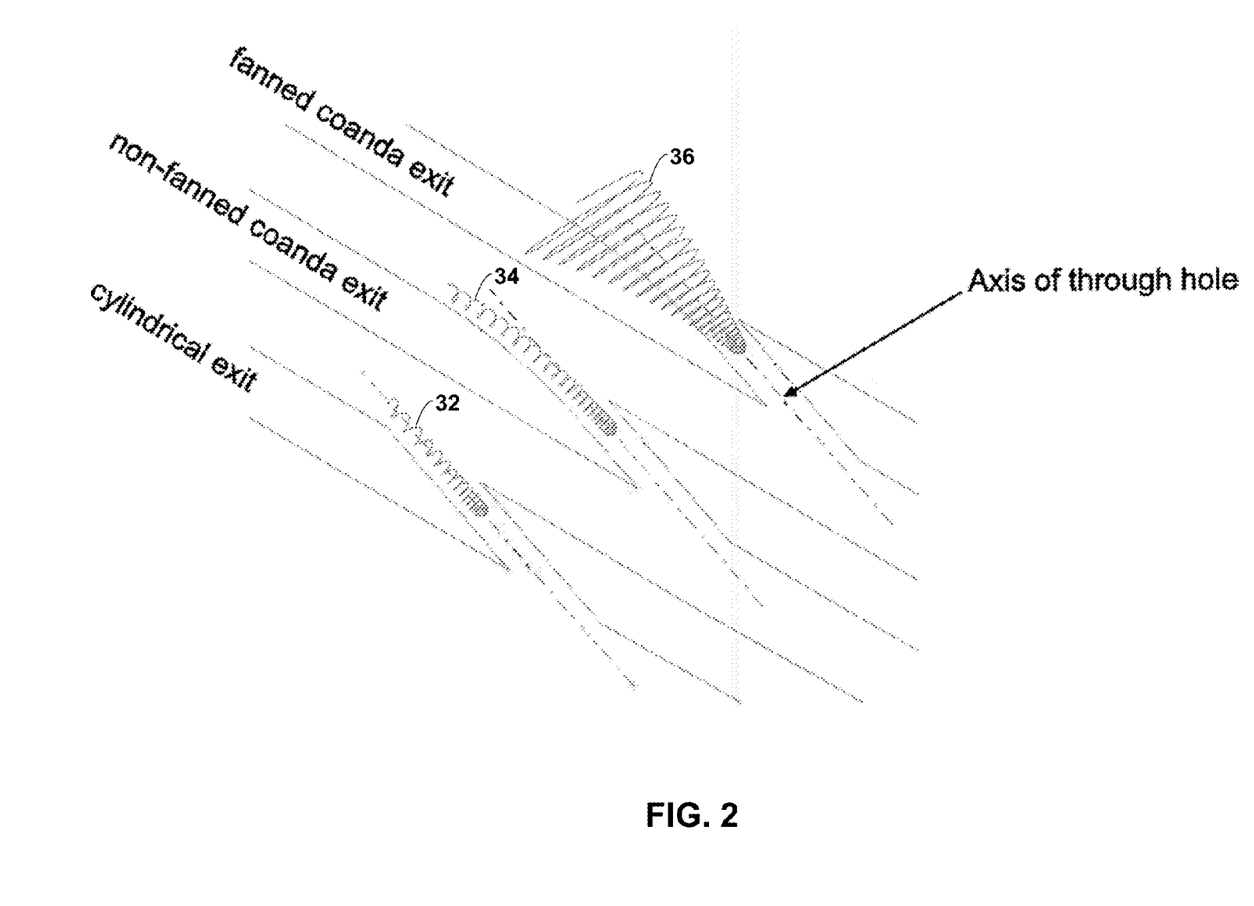
FIG. 2 is a conceptual illustration of machining paths for three different thin film cooling hole designs including a typical cylindrical cooling hole, a cooling hole with a Coanda ramp and a cooling hole with a fanned Coanda ramp.

FIG. 2 is a conceptual illustration of machining paths for three different thin film cooling hole designs including a standard cylindrical cooling hole path 32, a cooling hole with a Coanda ramp path 34 and a cooling hole with a fanned Coanda ramp path 36. Cylindrical cooling hole path 32 represents a helical cutting path at a consistent angle through the component. It is also possible to create a straight thin film cooling hole by simply drilling into the component. In contrast, cooling hole with a Coanda ramp path 34 is a helical cutting path that varies from a near zero angle basically flush with the surface of the component surface 3 to a progressively steeper angle that matches the angle of the straight section of the corresponding thin film cooling hole. Cooling hole with a fanned Coanda ramp path 36 is similar to cooling hole with a Coanda ramp path 34 except that cooling hole with a fanned Coanda ramp path 36 includes a helical motion that gets progressively tighter until the path reaches the straight section of the corresponding thin film cooling hole.

Figure 3:
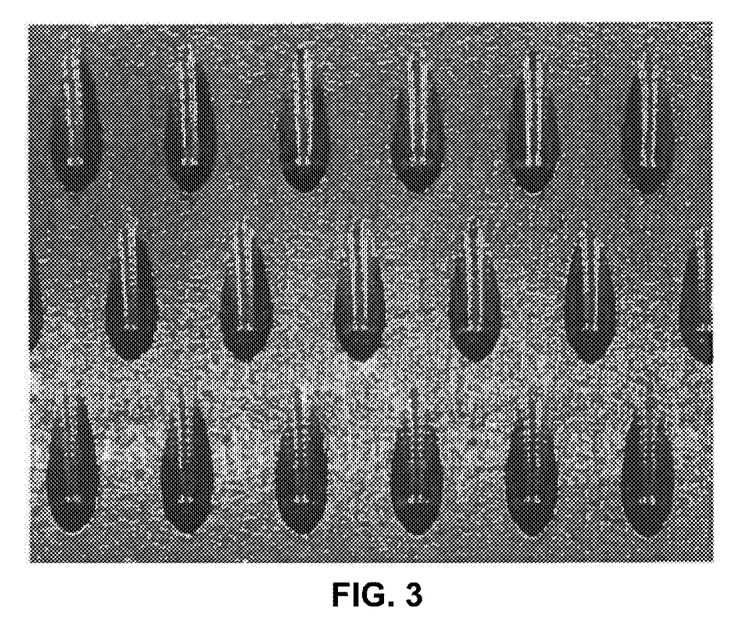
FIG. 3 is a picture of a component including an array of thin film cooling holes, each with a non-fanned Coanda ramp.
Figure 4:
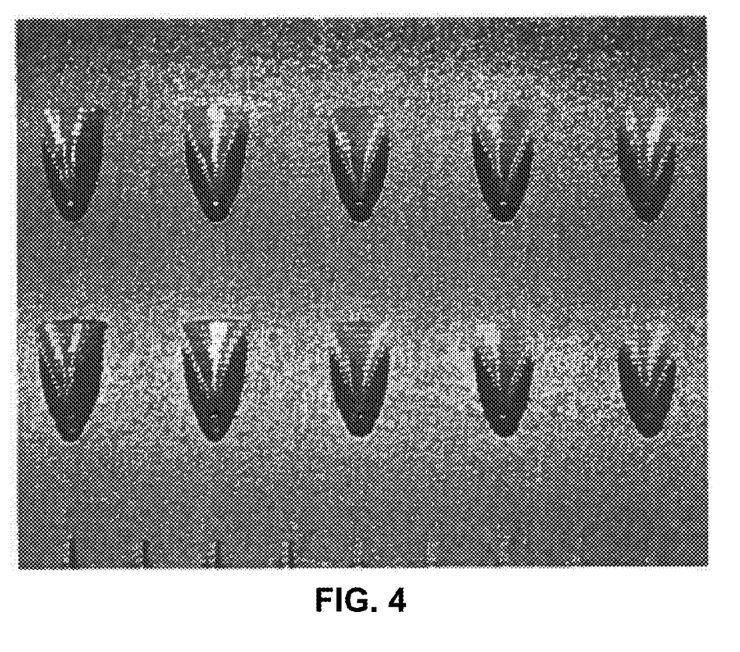
FIG. 4 is a picture of a component including an array of thin film cooling holes, each with a fanned Coanda ramp.
Figure 5A:
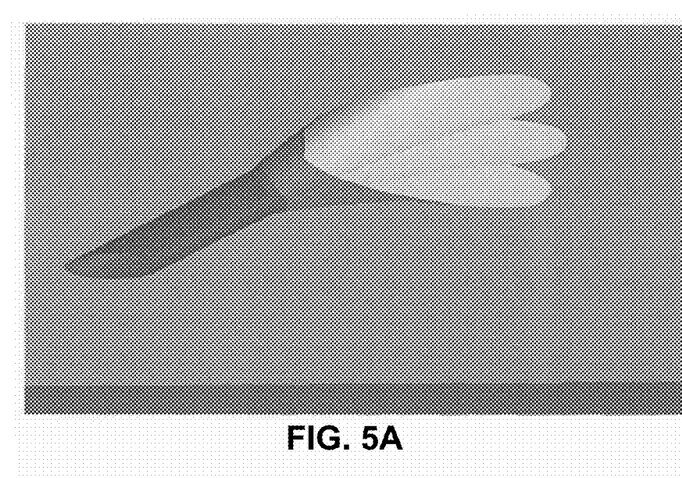
FIGS. 5A-5C are conceptual illustrations of a thin film cooling hole with a fanned Coanda ramp having three flow channels.
Figure 5B:
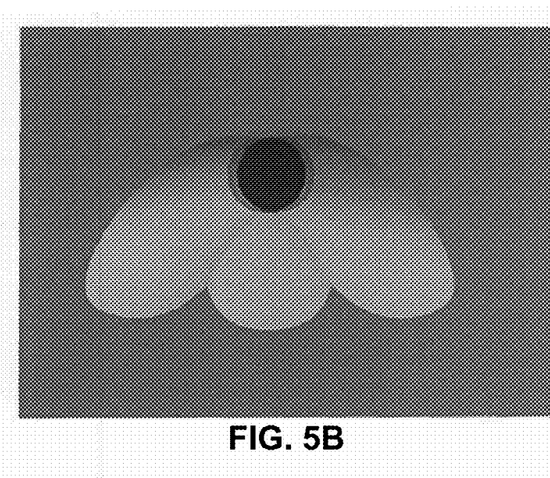
Figure 5C:
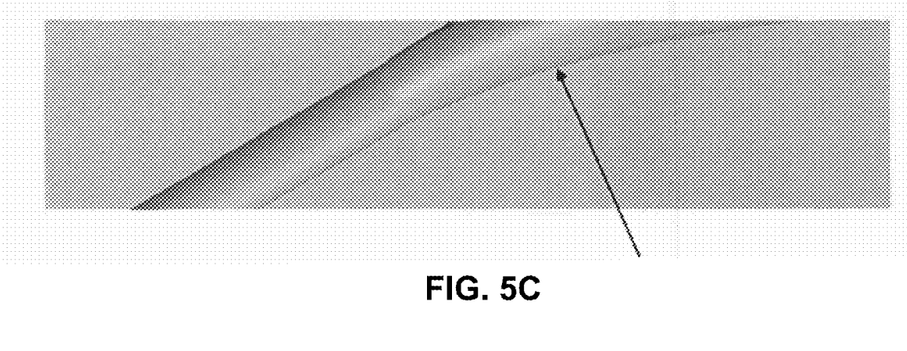
Figure 6:
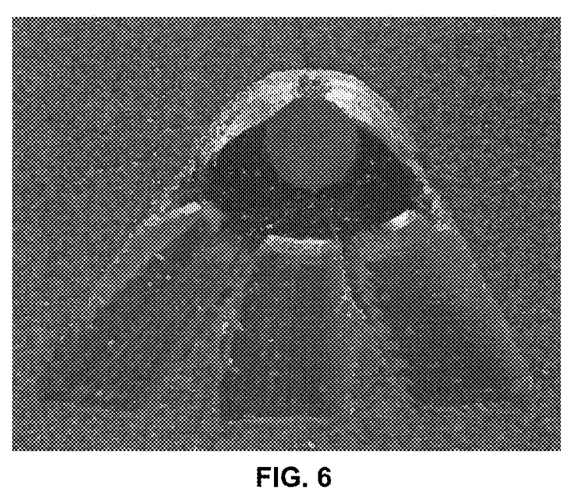
FIG. 6 is a picture of a component including a single thin film cooling hole with a fanned Coanda ramp having three flow channels.
Figure 7:
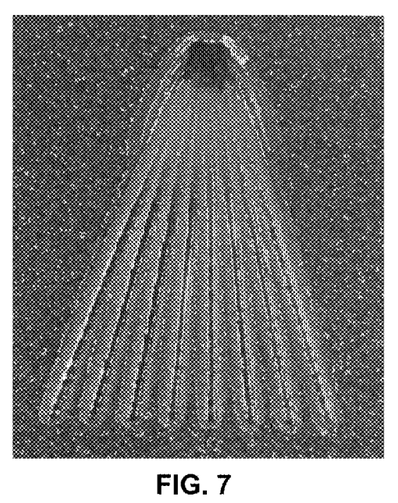
FIG. 7 is a picture of a component including a single thin film cooling hole with a fanned Coanda ramp having eight flow channels.
Figure 8:
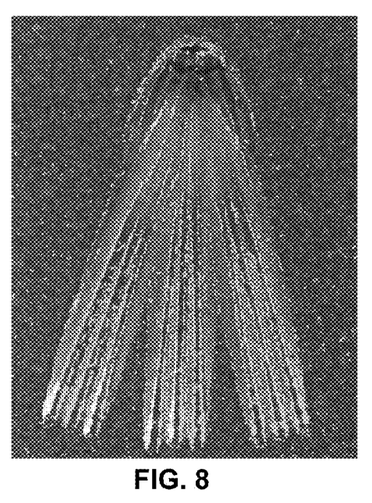
FIG. 8 is a picture of a component including a single thin film cooling hole with a fanned Coanda ramp having three groups of flow channels, each group of glow channels including three flow channels for a total of nine flow channels.

The thin film cooling holes illustrated in FIG. 3-FIG. 8 represent examples of thin film cooling hole configurations that are possible using adaptive machining of component surfaces with a high speed 5-axis cutter. In particular, FIG. 3 is a picture of component including an array of thin film cooling holes, each with a non-fanned Coanda ramp. The thin film cooling holes of FIG. 3 may be machined using cutting path 34 (FIG. 2). FIG. 4 is a picture of a component including an array of thin film cooling holes, each with a fanned Coanda ramp. The thin film cooling holes of FIG. 4 may be machined using cutting path 36 (FIG. 2). FIGS. 5A-5C are conceptual illustrations of a thin film cooling hole with a fanned Coanda ramp having three flow channels. FIG. 6 is a picture of a component including a single thin film cooling hole with a fanned Coanda ramp having three flow channels. FIG. 7 is a picture of a component including a single thin film cooling hole with a fanned Coanda ramp having eight flow channels. FIG. 8 is a picture of a component including a single thin film cooling hole with a fanned Coanda ramp having three groups of flow channels, each group of glow channels including three flow channels for a total of nine flow channels. The flow channels are separated by dividers and may be arranged to promote flow fanning in order to further limit the flow required to provide thin film cooling for a component. For example, the dividers may become progressively less pronounced between the smooth transition of a thin film cooling hole and the narrower width of the passage of the thin film cooling hole.

Figure 9:
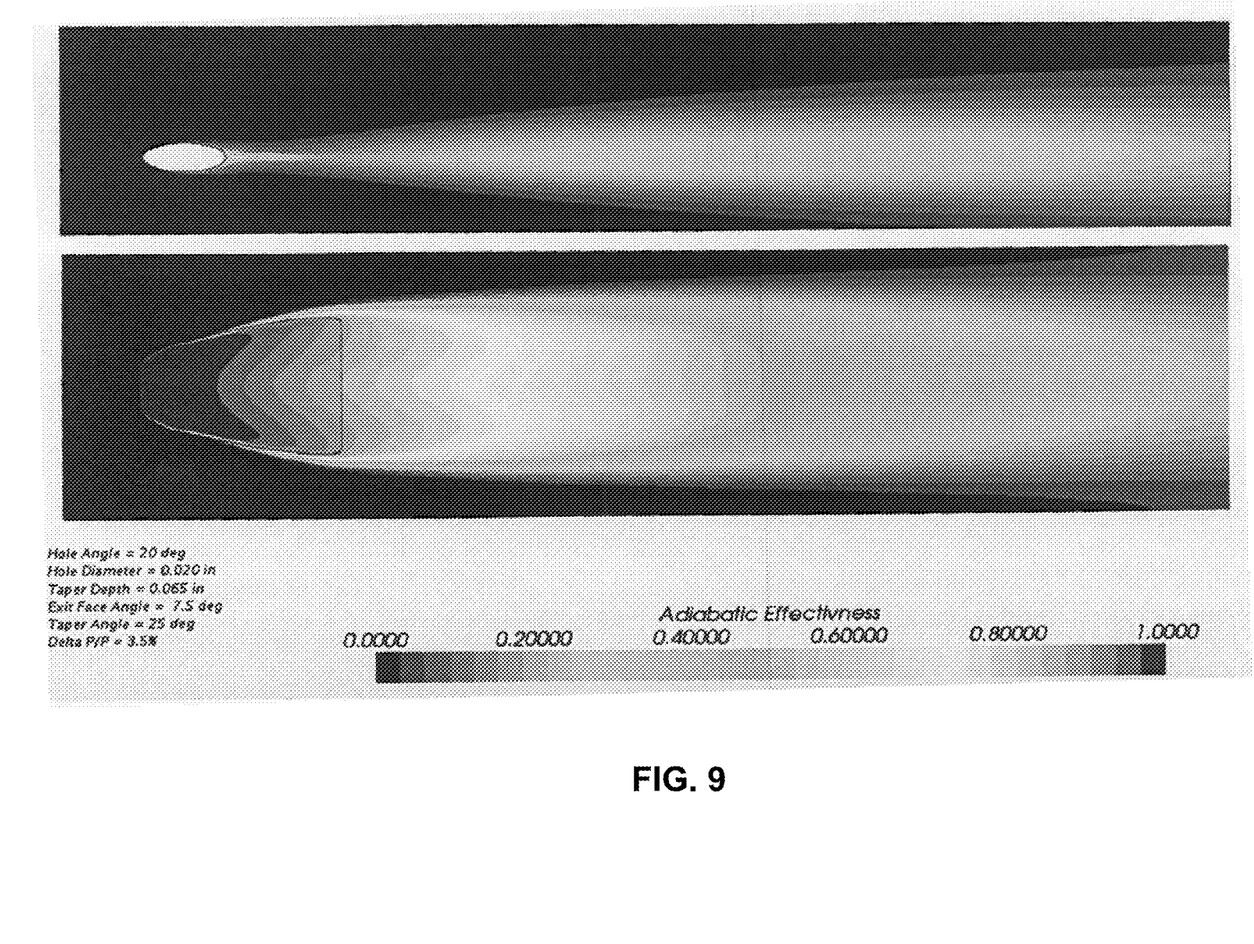
FIG. 9 illustrates airflows through a cylindrical thin film cooling hole and a thin film cooling hole with a fanned Coanda ramp.

FIG. 9 illustrates airflows through a cylindrical thin film cooling hole and a thin film cooling hole with a fanned Coanda ramp. As illustrated by FIG. 9, the cylindrical thin film cooling hole produces a relatively concentrated airflow path. In contrast, the thin film cooling hole with a fanned Coanda ramp produces a much wider airflow path.

Figure 10A:
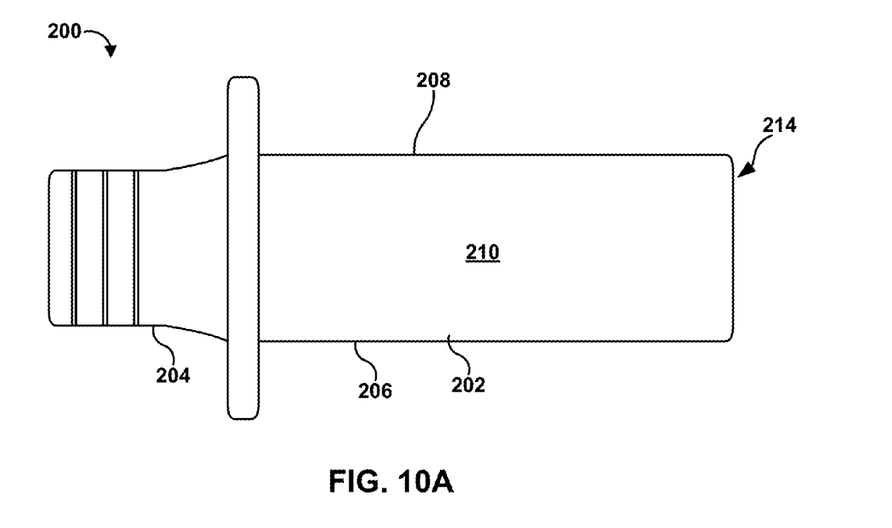
FIGS. 10A-C are conceptual diagrams of an example blade airfoil configured for use in a gas turbine engine, the airfoil including thin film cooling holes as disclosed herein.
Figure 10B:
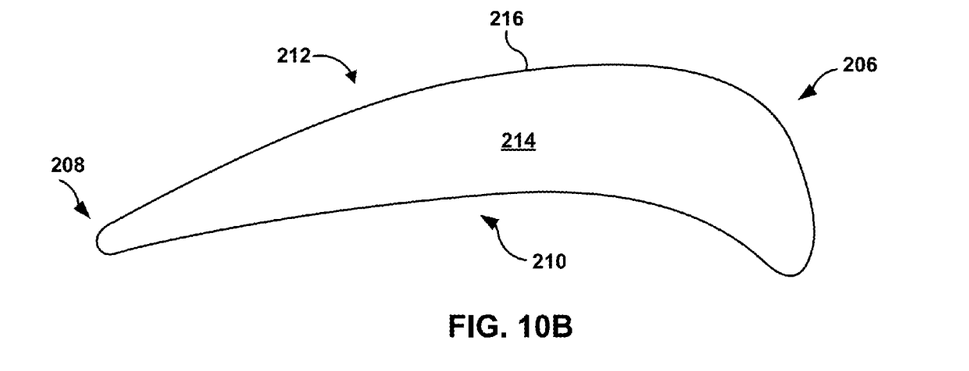
Figure 10C:
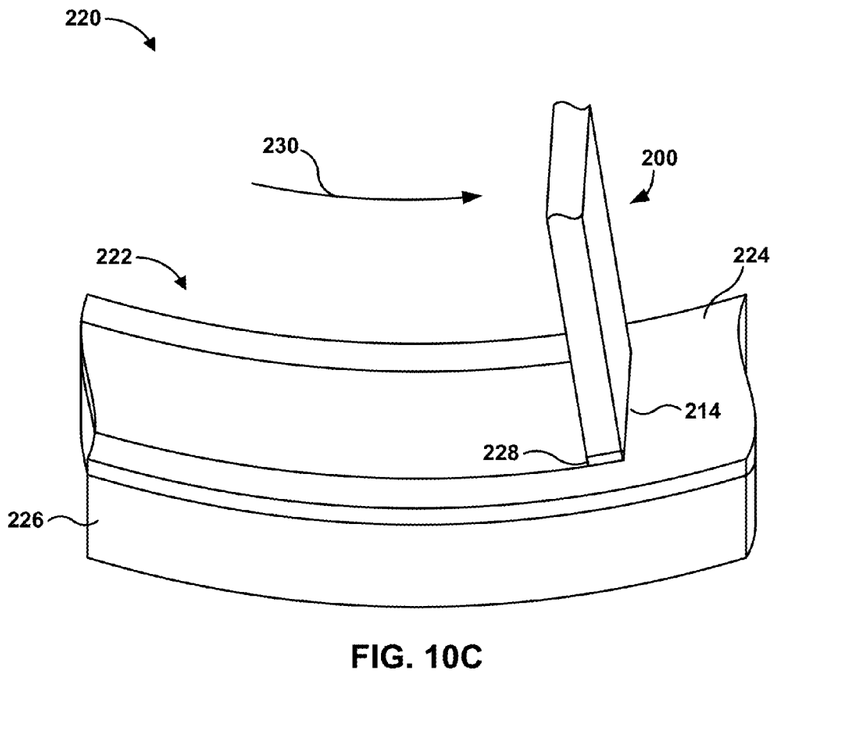

FIGS. 10A-C illustrate different views of an example blade 200 which may include features and arrays of features, such as thin film cooling holes, according to an example of the disclosure. Blade 200 generally includes airfoil 202 attached to stalk 204. Airfoil 202 includes a leading edge 206, a trailing edge 208, a pressure sidewall 210, and a suction sidewall 212. Pressure sidewall 210 is connected to suction sidewall 212 at leading edge 206 and trailing edge 208. Further, blade 200 defines blade tip 214, which is a surface substantially orthogonal to leading edge 206. Blade tip 214 is defined by an edge 216 that extends about the perimeter of the surface of blade tip 214, and separates the surface of blade tip 214 from the adjacent surface of airfoil 202. Leading edge 206, trailing edge 208, pressure sidewall 210, and suction side wall 212 generally extend from stalk 204 to edge 216.

In general, blade 200 is a component of a mechanical system including, e.g., a gas turbine engine. In different examples, blade 200 may be a compressor blade that imparts kinetic energy into a fluid or a turbine blade that extracts kinetic energy from a moving fluid. FIG. 10C is a conceptual diagram of an example gas turbine engine 220 with blade 200. Gas turbine engine 220 includes blade track or blade shroud 222, which is defined into a surface 224 of a turbine substrate 226. Blade 200 is shown with a tip coating 228, which is described in greater detail below, deposited on blade tip 214. Although a single blade 200 is shown in gas turbine engine 220 for ease of description, in actual operation, gas turbine engine 220 may include a plurality of blades.

During operation of gas turbine engine 220, blade 200 rotates relative to blade track 222 in a direction indicated by arrow 230. In general, the power and efficiency of gas turbine engine 220 can be increased by reducing the gap blade track 222 and blade 200, e.g., to reduce or eliminate gas leakage around blade 200. Thus, gas turbine engine 220, in various examples, is configured to allow blade 200 to abrade into surface 224 of turbine substrate 226, thereby defining blade track 222, which creates a seal between blade track 222 and blade 200. The abrading action may create high thermal and shear stress forces at blade tip 214. In addition, occasional movement of blade tip 214 relative to turbine substrate 226 during the operation of gas turbine engine 222 may cause blade tip 214 to impinge on turbine substrate 226, creating high shear forces at blade tip 214.

To protect against the various forces acting on blade 200 and, in particular, blade tip 214, one or more protective layers may be provided on blade 200 and/or blade tip 214. For example, a tip coating 228, may be provided on blade tip 214 to improve different properties of an underlying blade surface including, e.g., wear, corrosion, hardness, and/or temperature resistance properties of an underlying blade surface. Additionally or alternatively, a protective coating may be applied to an entire airfoil 202, including blade tip 214, to improve different properties of an underlying blade surface. In some examples, airfoil 202 may receive a coating that reduces or substantially eliminates the effects of oxidation or corrosion on airfoil 202. Regardless of the specific number or specific type of coatings applied to blade 200, in some examples, blade 200 may benefit from the features and arrays of features, such as thin film cooling holes, described in the disclosure.

Testing was performed to demonstrate cycle time improvements for the machining of thin film cooling holes as compared to manufacturing thin film cooling holes using EDM process for an airfoil such as airfoil 200. In this demonstration, 55 thin film cooling holes of about 0.5 mm in diameter at angles of about 10 degrees to about 30 degrees relative to perpendicular to the surface of the component were machined in a sample production blade airfoil. The demonstration resulted in a cycle time reduction over 66 percent as compared to manufacturing thin film cooling holes in the production blade airfoil using EDM processes.

An airfoil, such as blade 200, may include additional machined features, which may be machined in conjunction with the machining of thin film cooling holes to further reduce the cycle time required to the blade airfoil. For example, machining to produce a blade airfoil, such as blade 200, may include gating removal and/or throat machining at the leading edge of the blade airfoil. As another example, machining to produce a blade airfoil 240 may include hole drilling along the trailing edge of the blade airfoil. As further examples, machining to produce a blade airfoil may also include slash face along fore and aft faces and/or tip cap finishing. Each of these machining processes may be implemented in combination with machining of thin film cooling holes to further reduce the cycle time required to machine a blade airfoil, e.g., by only needing to determine the position of the blade airfoil once and machining each of these features while the blade airfoil is held in the same position. In addition, more than one feature may potentially be machined simultaneously on blade airfoil to further reduce cycle time.

Figure 11:
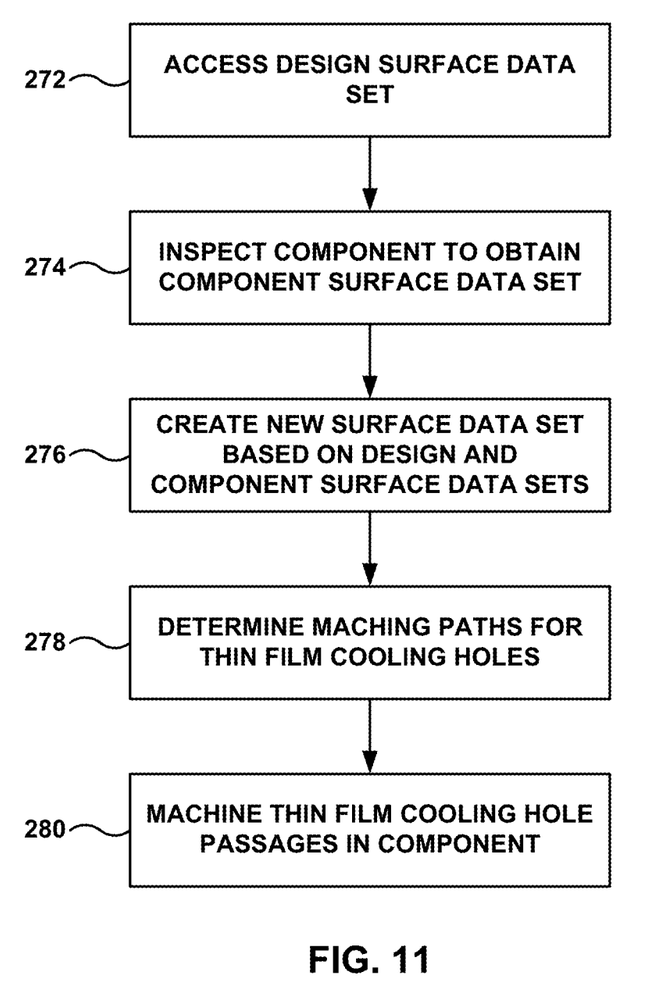
FIG. 11 is a flowchart illustrating example techniques for machining thin film cooling holes in a component.

FIG. 11 is a flowchart illustrating example techniques for machining thin film cooling holes in a component, such as thin film cooling holes 10A, 10B within component 2 (FIG. 1). For clarity, the techniques illustrated in FIG. 11 are discussed with respect to component 2 and thin film cooling holes 10A, 10B of FIG. 1. First, a machining control system (not shown) accesses a design surface data set (272). Then, the machining control system inspects component 2 to obtain a component surface data set that includes surface data for surface 3 of component 2 (274). The machining control system creates a new surface data set based on the design surface data set and the component surface data set, the new surface data set approximating the design surface data set while accounting for variation between a component specified by the design surface data set and the component surface data set (276).

Then the machining control system based on the new component surface data set, and thereby also based on the design surface data set and the component surface data set (278). For each of the thin film cooling holes, the machining control system issues instructions to machining a passage between surface 3 of component 2 and surface 4 of component 2 (280). Machining each passage may include multiple passes with the cutting tool, e.g., to produce Coanda ramp 12, straight section 14 and edge break 15.

The adaptive machining component surfaces techniques of FIG. 11 are described in further detail in U.S. Provisional Patent Application Ser. No. 61/772,848 by Jeffrey F. Rhodes, et al., titled, "ADAPTIVELY MACHINING COMPONENT SURFACES AND HOLE DRILLING," and filed Mar. 5, 2013, the entire contents of which were incorporated by reference herein.

FIGS. 12A-15B are close-up pictures illustrating components after forming holes, such a straight thin film cooling holes, using different manufacturing processes including picosecond laser, long pulse laser, EDM (bond coated) and mechanical machining processes.

Figure 12A:
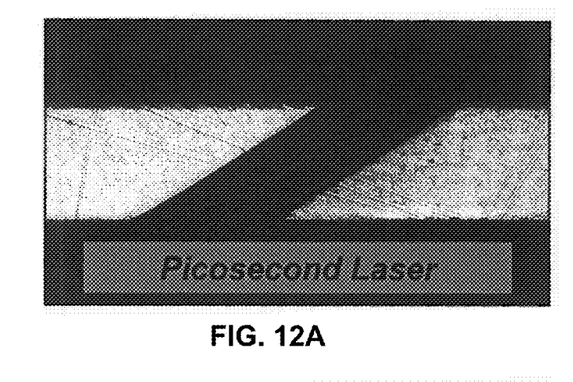
Figure 12B:
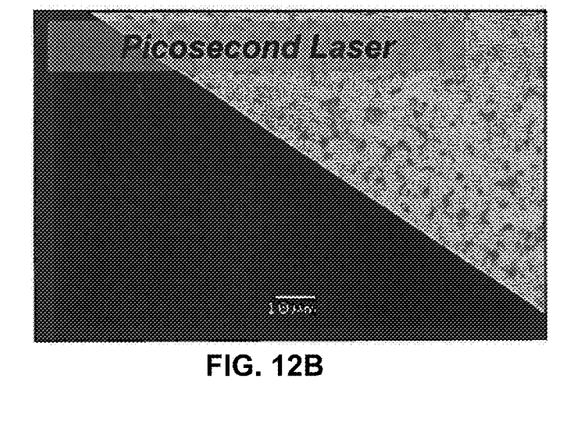

As illustrated by FIGS. 12A and 12B, picoseconds lasers produce relatively clean and straight cuts within a component. However, it would be difficult or even impossible to produce the intricate features of thin film cooling holes 10A, 10B (FIG. 1) using picoseconds lasers at least because controlling the depth of cut of a picoseconds laser generally requires placing something to absorb or reflect the laser within the component at the desired depth of the cut.

Figure 13A:
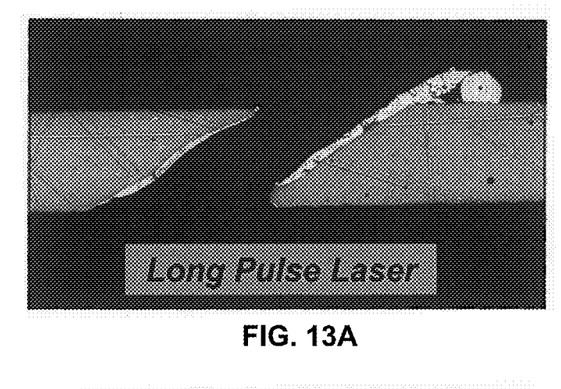
Figure 13B:
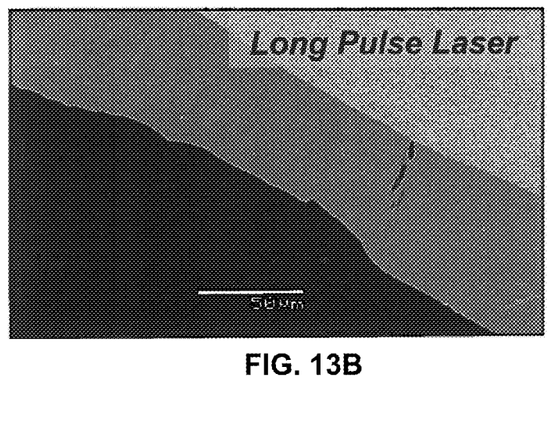

As illustrated by FIGS. 13A and 13B, long pulse lasers produce less precise cuts within a component as compared to picoseconds lasers. For this reason alone, it would be difficult or even impossible to produce the intricate features of thin film cooling holes 10A, 10B (FIG. 1) using long pulse lasers. In addition, as with picoseconds lasers, controlling the depth of cut generally requires placing something to absorb or reflect the laser within the component at the desired depth of the cut.

Figure 14A:
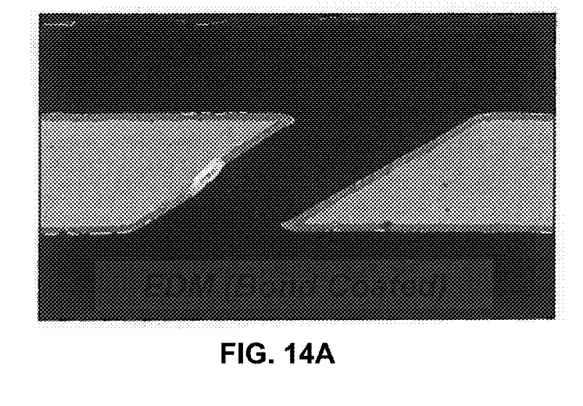
Figure 14B:
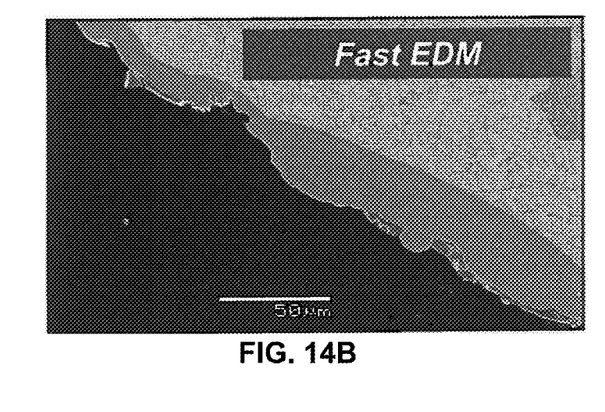

As illustrated by FIGS. 14A and 14B, EDM manufacturing techniques produce generally less precise cuts within a component as compared to picoseconds lasers, but generally more precise cuts as compared to long pulse lasers. It may be difficult to produce the intricate features of thin film cooling holes 10A, 10B (FIG. 1) using EDM manufacturing techniques. In addition, as discussed following the description of FIG. 10, EDM manufacturing techniques may take longer than equivalent machining techniques for thin film cooling holes.

Figure 15A:
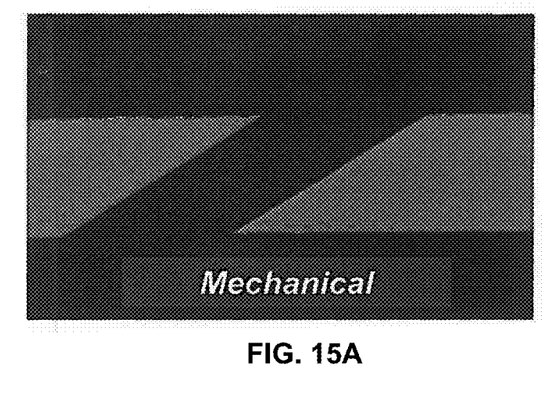
Figure 15B:
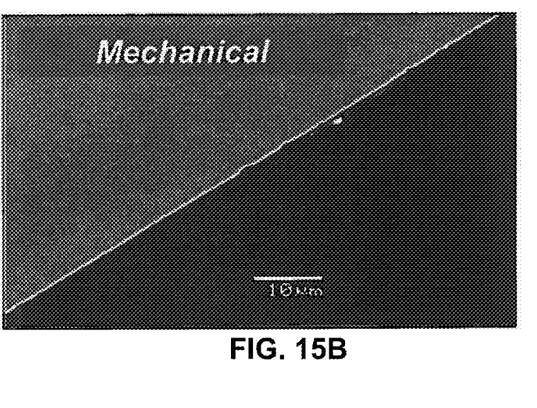

In contrast, as illustrated by FIGS. 15A and 15B, mechanical machining produces the smallest tolerances of any of the manufacturing processes represented in FIGS. 12A-15B. As disclosed herein, a mechanical machining technique may be used to produce thin film cooling holes with intricate features such as smooth transitions between a ramp of the thin film cooling hole, Coanda or other curved ramps and edge breaks to reduce stress concentrations within components including thin film cooling holes.

Various examples of this disclosure have been described. These and other examples are within the scope of the following claims.

What is claimed is:

1. A component comprising a set of thin film cooling holes formed therein,
   wherein each of the thin film cooling holes provides a passage between a first surface of the component and a second surface of the component, and
   wherein each of the thin film cooling holes includes:
      a smooth transition between the first surface of the component and the surface the passage;
      a progressively steeper flow path relative to the first surface of the component and between the smooth transition and the second surface of the component;
      a lip opposing the smooth transition at the interface between the first surface of the component and the passage; and
      an edge break at the lip on the first surface of the component.

2. The component of claim 1, wherein each of the thin film cooling holes forms a Coanda ramp that provides the smooth transition and the progressively steeper flow path.

3. The component of claim 1, wherein each of the thin film cooling holes further includes a straight section between the progressively steeper flow path and the second surface of the component.

4. The component of claim 3, wherein for each of the thin film cooling holes, the smooth transition is a first smooth transition, wherein each of the thin film cooling holes further includes a second smooth transition between the progressively steeper flow path and the straight section.

5. The component of claim 3, wherein for each of the thin film cooling holes, the straight section is at an angle of less than 75 degrees relative to the second surface of the component.

6. The component of claim 1, wherein for each of the thin film cooling holes, the smooth transition between the first surface of the component and the surface the passage is wider than the most narrow width of the passage, wherein for each of the thin film cooling holes, the progressively steeper flow path progressively narrows from the width of the smooth transition to the most narrow width of the passage.

7. The component of claim 6, wherein for each of the thin film cooling holes, the smooth transition between the first surface of the component and the surface the passage forms at least two separate flow channels separated by one or more dividers within the progressively steeper flow path.

8. The component of claim 7, wherein for each of the thin film cooling holes, wherein the dividers become progressively less pronounced between the smooth transition and the most narrow width of the passage.

9. A component comprising a set of thin film cooling holes formed therein,
wherein each of the thin film cooling holes provides a passage between a first surface of the component and a second surface of the component,
wherein the passage enters the first surface of the component at a non-perpendicular angle to form an overhang over the passage at a lip on one side of the interface between the passage and the first surface of the component, and
wherein the passage includes an edge break at the overhang on the first surface of the component.

10. The component of claim 9, wherein the edge break functions to dull the transition between the passage and the first surface of the component to limit stress concentrations at the lip.

11. The component of claim 9, wherein for each of the thin film cooling holes, the component forms an overhang over the passage at the lip on the first surface of the component.

12. The component of claim 9, wherein for each of the thin film cooling holes, the non-perpendicular angle less than 75 degrees relative to the first surface of the component.

13. The component of claim 9, wherein each of the thin film cooling holes includes a smooth transition between the first surface of the component and the surface the passage, the smooth transition opposing the lip at the interface between the first surface of the component and the passage.

14. The component of claim 13, wherein for each of the thin film cooling holes, the smooth transition between the first surface of the component and the surface the passage forms at least two separate flow channels separated by one or more dividers.

15. A method of manufacturing an array of thin film cooling holes in a component, the method comprising:
inspecting the component to obtain a component surface data set;
determining machining paths for each of the thin film cooling holes in the array of thin film cooling holes based on the component surface data set; and
for each of the thin film cooling holes, machining a passage between a first surface of the component and a second surface of the component,
wherein machining the passage includes:
machining a smooth transition between the first surface of the component and the surface the passage,
machining a progressively steeper flow path relative to the first surface of the component and between the smooth transition and the second surface of the component, and
machining an edge break at a lip opposing the smooth transition at the interface between the first surface of the component and the passage.

16. The method of claim 15, wherein determining machining paths for each of the thin film cooling holes in the array of thin film cooling holes based on the component surface data set comprises:
accessing a design surface data set;
creating a new surface data set based on the design surface data set and the component surface data set, the new surface data set approximating the design surface data set while accounting for variation between a component specified by the design surface data set and the component surface data set; and
generating machining paths for each of the thin film cooling holes based on the new surface data set.

17. The method of claim 16, further including determining a degree of variation in response to the new surface data set and the design surface data set and predicting a quality outcome in response to the degree of variation.

18. The method of claim 15, further including securing the component in a fixture and obtaining the component surface data set of the component in relation to the fixture.

19. The method of claim 18, further including determining a hole location in response to the component surface data set of the component in relation to the fixture, wherein machining the passage further includes machining the component in response to the machining path and the hole location.

* * * * *